United States Patent [19]

Pandey

[11] 4,016,361
[45] Apr. 5, 1977

[54] APPARATUS FOR STORING DATA BROADCAST IN DIGITAL FORM FOR GENERATING A CHARACTER DISPLAY OR FOR RECORDING SUCH DATA FOR LATER PLAYBACK

[75] Inventor: Kailash Narain Pandey, Cambridge, England

[73] Assignee: Texas Instruments Incorporated, Dallas, Tex.

[22] Filed: Sept. 2, 1975

[21] Appl. No.: 609,654

[30] Foreign Application Priority Data

Sept. 26, 1974 United Kingdom ............ 41965/74

[52] U.S. Cl. ..................................... 358/83; 360/9; 358/127
[51] Int. Cl.² .......................................... H04N 5/76
[58] Field of Search ............ 178/5.6, 5.8, DIG. 22, 178/DIG. 23, DIG. 13, 6.6 DD, 6.6 R; 360/33, 9, 10

[56] References Cited

UNITED STATES PATENTS

| | | | |
|---|---|---|---|
| 3,493,674 | 2/1970 | Houghton | 178/5.6 |
| 3,891,792 | 6/1975 | Kimura | 178/5.6 |
| 3,909,512 | 9/1975 | Omori et al. | 178/5.6 |
| 3,927,250 | 12/1975 | Rainger | 178/5.6 |

Primary Examiner—John C. Martin
Attorney, Agent, or Firm—Harold Levine; Richard L. Donaldson; James T. Comfort

[57] ABSTRACT

Apparatus for use in conjunction with a television broadcast receiver for storing, in a main memory, digital data transmitted during portions of the transmitted video signals not used for picture signal content. The digital data is extracted at the receiver at a high data rate and stored in the main memory. The stored data may be used, under viewer control, to generate a character display on the display tube of the receiver. Alternatively, the data content of the main store may be written into a first buffer store from which data is read out at a slow rate and stored by a low frequency signal recorder. Data signals may subsequently be read out from that recorder (or from a separate recorder on which suitable data signals have independently been recorded) into a second buffer store from which they are inputted at a high data rate into the main memory for generation of a display. By use of such apparatus, information represented by the received digital data may be accumulated in the main memory for viewer-controlled display or recorded by a low frequency recorder for retention and subsequent replay. Additionally, information from other sources suitably recorded on a low frequency recorder may be entered into the main memory for display by the receiver.

10 Claims, 1 Drawing Figure

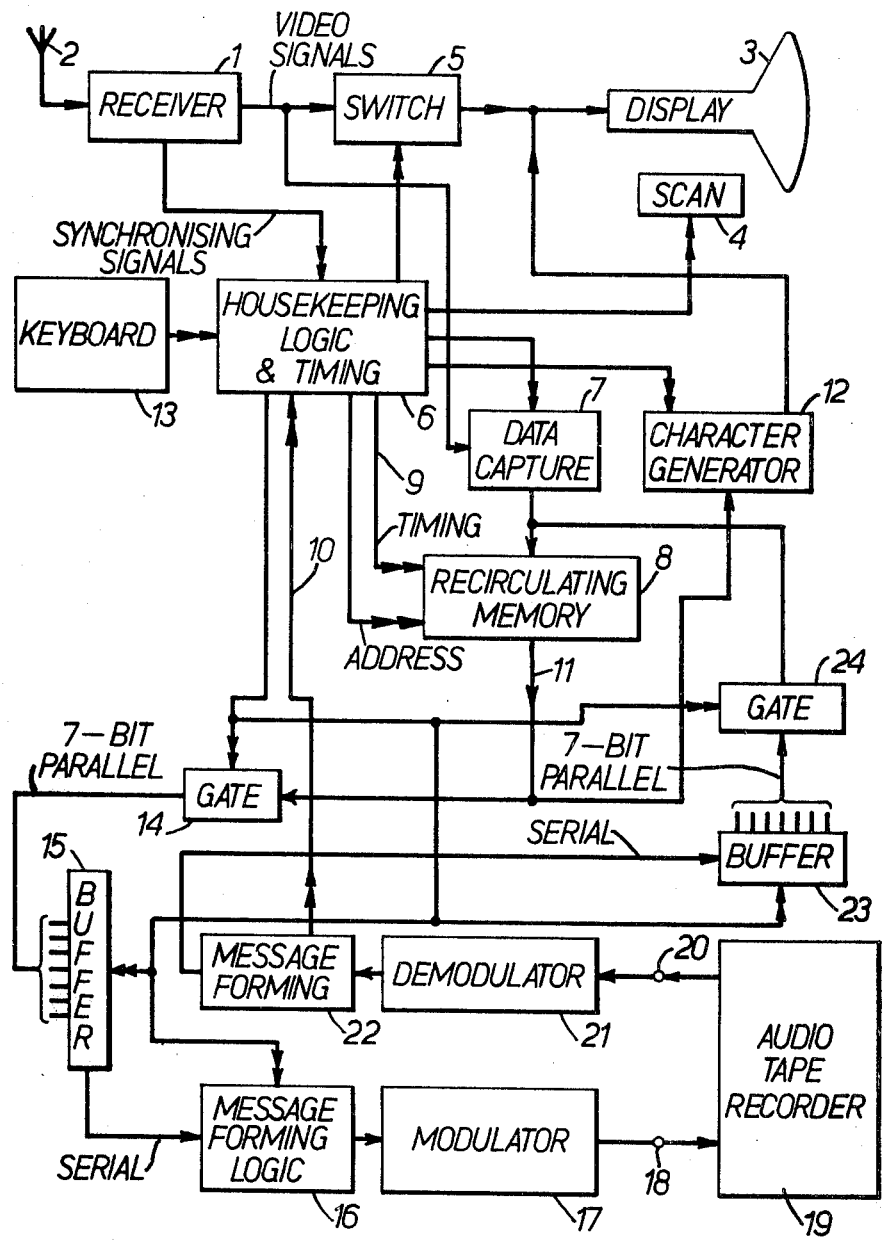

APPARATUS FOR STORING DATA BROADCAST IN DIGITAL FORM FOR GENERATING A CHARACTER DISPLAY OR FOR RECORDING SUCH DATA FOR LATER PLAYBACK

This invention relates to data handling apparatus for use in conjunction with a television receiver, the apparatus handling data transmitted in a television signal in digital form and completely separate from the television program information carried by the same signal.

Various proposals have been made for transmitting additional information in unused parts of a television signal. One such proposal involves the insertion of digitally coded information into one or more of the unused lines which precede the lines containing video information in each frame of the scan. In one of these proposals the information in each field constitutes 40 characters which when set out in a line convey information to a reader. Such previously proposed apparatus envisaged the provision of storage means for, say, 25 lines of characters which are converted to a form suitable for display by the television display tube, the normal video information being suppressed at the time. The kinds of information which could be transmitted in this way included weather forecasts, market reports and news items. One such proposal is described in Technical Memorandum No. PH-1111, "CEEFAX: EXPERIMENTAL SYSTEM PARAMETERS", June 1973, British Broadcasting Corporation.

It is an object of the present invention to provide an improvement in the above types of apparatus which enhances their flexibility and renders them suitable for other forms of display.

According to the present invention, there is provided data handling apparatus for use in conjunction with a television receiver, the apparatus including: means for selecting parts of a television signal received by a receiver and applying data at a high data rate from the selected parts to a main high speed storage means for the data; means for selectively reading data from the main storage means and for producing therefrom vidoe signals for generating a legible display of the selected data, for example, on a display tube of a television receiver; buffer storage means for receiving data from the main storage means, a group of digits at a time; and means for reading data at low speed from the buffer storage means and for producing therefrom signals for recording by a relatively-low-frequency signal recorder, for example, an audio frequency signal recorder; means for deriving data signals from signals from a relatively-low-frequency signal recorder; and buffer storage means for receiving the derived data signals and for producing therefrom data signals at a high data rate, a group of digits at a time, which are applied to the main storage means. A single buffer storage means may be used to effect both the slowing down and the speeding up of the data read from or applied to the main storage means, when these operations take place at different times. Alternatively, two separate buffer storage means may be used.

The data derived from a television signal would probably have a digit rate of 3 to 4 MHz, and if it were required to store more than a few thousand digits of such information it would be necessary to provide a large store capable of rapid operation, which would be expensive. In order to overcome this difficulty, one embodiment of the present invention envisages, for example, the use of a simple audio-frequency tape recorder for storing the data after its rate has been slowed sufficiently for reasonable recording and reproduction by such a tape recorder. Assuming that the high frequency which the tape recorder can record and reproduce reliably is 7 kHz, it follows that 3-4 MHz digit rate data derived from the television signal must be slowed down by a factor of about 500. The slowing down of the data is achieved by providing a main high speed storage means for data derived from the television signal and from which a display on the display screen of a television receiver can be reproduced, and by reading a group of digits at a time from the main storage means into a first buffer storage means, the groups of digits can be slowed down, by reading from the buffer storage means at a low rate so that signals suitable for recording by an audio frequency recorder are obtained. Data signals read from an audio frequency recorder must be similarly speeded up to enable reproduction of the data to be obtained, and it is proposed that this speeding up be achieved by means of a second buffer storage means into which the data signals from the recorder are entered at a relatively slow rate and from which they are read at a relatively high rate suitable for display and/or entry into the main storage means.

The main storage means may consist of a recirculating memory capable of storing the data derived from an otherwise vacant line of a television signal. If the television signal has 625 lines per frame and a frame rate of 25 per second using single interlace, it follows that the duration of a line is 64 $\mu$s, so that the data from one line can simply be entered into the memory. The data in the memory can be read out at a relatively slow rate by strobing the output of the memory as it recirculates. In one coding system it has been proposed that each character is represented by a six-bit group, with an additional bit serving as a parity check. Thus the memory forming the main storage means may conveniently be arranged to store the data in a seven-bit parallel format, so that the digits of a character are presented in parallel. Since an audio frequency signal recorder in its simplest form can record only a single item of information at a time, it is clear that the buffers stores should include parallel to serial conversion to produce the input signal to the recorder and serial to parallel conversion for handling the output signal from the recorder.

Some kind of modulator must be provided for converting the digital information into a form suitable for an audio signal recorder, and this may operate by frequency shift keying, for example. Suitable modulators are those used for instrumentation recording.

It is preferable also that some means be provided for identifying the messages recorded on the audio-frequency tape recorder, and this may typically include start and finish codes to indicate the direction in which the message should be played, together with some kind of title or address identifying the current of the particular message.

The main storage means may alternatively be a random access memory with a suitable addressing mechanism. The, or each, buffer storage means may be a shift register.

In order that the invention may be more fully understood and readily carried into effect, it will now be described, by way of example, with reference to a single figure of the accompanying drawing which shows in block diagrammatic form one embodiment of the invention connected to a television receiver and an audio-frequency tape recorder.

Referring now to the drawing, a television receiver 1 is connected to an antenna 2 to receive television broadcast signals. The receiver also includes a visual display tube 3 and scanning means 4 which are normally coupled directly to the receiver to receive from it video signals and synchronising signals respectively. Because the data handling apparatus embodying the invention is connected to a television receiver, the video signals are only applied to the display tube 3 via a switch 5 and the synchronising signals are only applied to the scanning unit 4 via a housekeeping logic and timing unit 6. For convenience in the drawing, information channels are marked by a single arrow and timing and control connections have a double arrow. The video signals from the receiver 1 are also fed to a data capture unit 7 controlled by an output from the unit 6, the capture data output being applied to the input of a recirculating memory 8. Timing and address information for the memory 8 are applied to it from the unit 6 over channels 9 and 10. The memory 8 has an internal recirculation path which is not shown in the drawing, but the memory is updated when an appropriately timed input signal is applied to it, the input signal data replacing that previously in the memory at the particular address. In addition, the memory 8 produces on an output channel 11 the data recirculating in the memory every time it appears at its output. The channel 11 is connected to the input of a character generator 12, also controlled by the unit 6, which converts the binary code data from the memory 8 into video signals suitable for producing on the display tube 3 a legible reproduction of the data in the memory 8. The operation of the character generator 12 is synchronised with the scanning of the display tube. A keyboard 13 is provided for controlling the data captured from the video output of the receiver 1 and the display on the display tube 3.

As thus far described, the apparatus shown operates as follows.

The television receiver can operate in conventional manner when the switch 5 is closed to pass the vidoe signal output from the receiver 1 to the display tube 3 and the synchronising signals from the receiver 1 are applied to the scanning unit 4. During such conventional operation of the television receiver, or otherwise, the parts of the video signal may be selected by the data capture unit 7 under control of the unit 6, taking its instructions from the keyboard 13. As explained above, it has been proposed to insert digitally coded data into one or more of the otherwise unused lines at the beginning of the field and this data will include some kind of identification or address information indicating where it fits into the additional data being included in the television transmission. The data capture unit 7 is instructed by the unit 6 as to the identification code to be sought, which code will accompany the desired parts of the signal to be extracted. When the appropriate information has been found, it is applied by means of the unit 7 to the memory 8 for recording therein at an appropriate address. It is envisaged that the memory 8 will have storage sufficient for a whole "page" of data consisting of 24 rows each containing 40 characters. As each character is represented by seven bits, it follows that the memory 8 must include storage for 6720 bits of information. These 6720 bits may conveniently be organized so that each row of information is stored in serial form, 40 characters to a row, with each character represented by a 7-bit parallel code. This storage capability is repeated 24 times to provide the required storage for the whole page. When reproduction of the information is desired, an instruction is sent from the keyboard 13 to the unit 6 which causes the memory 8 to feed the data stored in it in the appropriate order starting at the top of the field as it is scanned and progressing to the bottom. During this reproduction, the video output from the receiver 1 is suppressed by the opening of the switch 5, and if the receiver 1 is switched off so that no synchronising signals are obtained from it, synchronising signals may be produced independently by the unit 6 and applied to the scanning unit 4. The video signals produced by the character generator 12 will be so formed as to be suitable for reproduction by an interlaced scanning system and the whole apparatus will be such that the display will be held unchanged for as long as is required.

As thus far described, the apparatus is capable of displaying the data included as an additional signal in a television transmission. The remaining components constitute one example of apparatus according to the invention when connected to the system described above. The output channel 11 of the memory 8 is also connected via a gate 14, controlled by an output from the unit 6, to a buffer store 15. As the output from the memory 8 is in 7-bit parallel form, it follows that the gate 14 is constituted by seven gates operated in parallel and that the buffer 15 is a 7-bit store with parallel inputs. The data in the store 15 read out in serial form and applied to a message forming logic unit 16 which adds to the serial gated data from the buffer 15 start, finish and address codes when necessary. Whereas the input to the buffer 15 is in 7-bit parallel form, and would be at a high data rate matching the output from the memory 8, the output signals from the buffer 15 are at a much slower rate, for example, at 7000 or 7k bits per second. The message forming logic 16 is designed to operate at a rate matching the digit rate from the buffer 15. The complete messages from the unit 16 are then applied to a modulator 17 which, for example, converts the digital signals to frequency shift keyed (FSK) form or some other form suitable for recording by an audio frequency recorder. The modulated signals appear at a terminal 18 and as shown in the drawing are applied to an input of an audio tape recorder 19. An audio frequency tape recorder is suggested for the recorder 19 as such recorders are widely used at home and are the most likely kind of recorder to be readily and economically available. Nevertheless, the invention is applicable to other kinds of recorder.

When a suitable message has been recorded by the recorder 19, it may be replayed and applied via a terminal 20 to a demodulator 21 which reconverts the modulated data signal to a normal digital data form. The reformed digital signals are applied to a message selection circuit 22 which feeds a signal to the unit 6 indicating the time of start and finish of the message being played by the recorder and also the address of that message. At an appropriate time, a buffer store 23 is enabled to receive the output from the message selection circuit 22 and reconverts it to 7-bit parallel form. The output signals from the buffer 23 are gated by a gate 24 into the input of the memory 8.

For situations in which the above described slowing down and speeding up of data read from or written into the main store 8 will not occur simultaneously, a single buffer store may be used in place of the two buffer stores 15 and 23 described above.

In the example described above, the memory 8 is recirculating with a cycle time of 64 μs. The gate 14 is controlled by the unit 6 to select successively the 7-bit groups of digits from the memory 8 and apply them to the buffer store 15. As the buffer store 15 takes about 1 ms to be read, it follows that the gate 14 can only pass a group of digits each millisecond during which time the memory 8 will have recirculated approximately a thousand times. It can be seen therefore that by timing the opening of the gate 14 to occur every 1024 μs + 1 digit time of the memory 8 (about 1.6 μs) the 7-bit groups representing the characters of a row can be applied successively to the buffer store 15. From the store 15 the data from the memory 8 appears in serial form at a bit rate of, for example, 7000 per second, suitable for recording by the recorder 19. During replay, the data from the recorder 19 is entered into the memory 8 at the correct speed and in the required 7-bit format. As explained above, the memory 8 has sufficient capacity for storing a page of data, that is, 24 rows, each containing 40 characters, each character being represented by 7 bits in parallel. During reading from the memory 8 and writing into it, appropriate information identifying the row is applied to it from the unit 6 over the channel 10.

The recorder 19 could be arranged to record several pages of information and the address data added by the logic unit 16 would include a component indicating the page of data represented by the message. Similarly, the message selection circuit 22 would be arranged to identify an appropriate message from the recorder 19 and and would ignore messages other than that having the correct address. The address of the required message would be entered by means of the keyboard 13 into the unit 6. The address information may also include a time code which would correspond to the time of transmission of the particular row of information which also could be entered through the keyboard 13 or alternatively automatically from a clock included in the circuit (not shown). It is possible for the television transmission to include a time code or some other means for identifying a particular batch of data and this could be stored in the unit 6.

The present invention provides a capability for recording the additional data during, for example, a television program it is desired to view, and enables this recorded information to be replayed subsequently. The recording may be regulated by means, for example, a suitable clock or some other kind of control signal which senses when a particular item of data is being transmitted. The rate of transmission of the additional data can be increased because of the additional storage provided in accordance with the invention since it is no longer necessary to limit the rate of transmission of information to allow time for it to be read and digested. Other kinds of information could be recorded on the tape or other recording medium used and played through the display system; thus it is not necessary for the data played back to have been recorded from a transmission of the type described. Furthermore, information suitably recorded on a separate recorder from the recorder 19 may be played back through the display systme, as described above. The invention offers the possibility of assembling a library of specific information derived on a day-to-day basis, for example, stock market quotations, recipes, racing results and so on. As an alternative to the television screen display, a hand copy printer, for example, operating on an electrostatic principle could be fed by the output of the character generator 12 and a newspaper printed from the additional data.

What is claimed is:

1. Data handling apparatus for use in conjunction with a television receiver; said apparatus including means for selecting parts of a television signal received by said receiver, deriving data from said selected parts and applying said data at a high data rate to a main high speed storage means for the data; means for selectively reading data from said main storage means and for producing therefrom video signals for generating a legible display of the selected data; first buffer storage means for receiving data from the main storage means, a group of digits at a time; means for reading data at low speed from said buffer storage means and producing therefrom signals suitable for recording by a relatively low frequency signal recorder; means for deriving data signals from signals from a relatively low frequency signal recorder; and second buffer storage means for receiving the derived data signals and for producing therefrom data signals at a high data rate, a group of digits at a time, and for applying said digit groups to said main storage means.

2. Apparatus according to claim 1, wherein said data derived from the selected parts of said television signal is in serial binary coded from in which a group of binary digits represents a character; and said means for producing video signals in response to the binary coded data is adapted to receive a group of digits at a time to generate video signals representing parts of characters represented by said groups of digits.

3. Apparatus according to claim 2, wherein said main storage means is arranged to store said groups of digits in parallel, with the data derived from a single field of said television signal stored sequentially; said main storage means being arranged to recirculate the data stored in it with a cycle time equal to the line scan period of the television signal.

4. Apparatus according to claim 3, wherein each said character is represented by six digits and each said group of digits includes a further digit in the form of a parity check digit.

5. Apparatus according to claim 1, wherein both of said buffer storage means are provided by a single buffer store.

6. Apparatus according to claim 3, wherein the first buffer storage means is arranged to receive a group of digits in parallel and arranged to output the digits in serial form at a rate suitable for recording by a low frequency signal recorder; and the second buffer storage means is arranged to receive signals derived from a low frequency signal recorder in serial form and produce therefrom groups of digits in parallel.

7. In combination with television broadcast receiving apparatus for receiving broadcast television signals each comprising first and second signal portions, said first signal portions including video signal information for controlling generation of a picture to be displayed by display means of said receiver by a series of line scans over each of a succession of fields of said television signal, and said second signal portions including digital data signals;

a. means for selectively extracting said digital data signals from said second signal portions, said extracted digital data signals being in serial binary coded form in which a group of binary digits represents a character;

b. means for applying said extracted signals at a high data rate to a main high speed storage means for storage of said groups of digits in parallel with data signals extracted from a single field of a said television signal stored sequentially, said main storage means adapted to recirculate data signals stored therein with a cycle time equal to the line scan period of said television signal;

c. means for selectively reading respective groups of data signals from said main storage means to produce video signals representing parts of characters represented by said groups of digits, for generation of a legible display of said selected data by said display means;

d. first buffer storage means selectively connectible to said main storage means for receiving groups of digit signals, a group at a time, in parallel and for outputting said digit signals in serial form;

e. means for reading said serial digital signals from said first buffer storage means at a low data rate for recording by low frequency signal recorder means;

f. means for deriving digital data signals from low frequency signal recorder means and for inputting said data signals in serial form to second buffer storage means; and g. means for outputting from said second buffer storage means, groups of stored digits in parallel, a group at a time, at a high data rate and for inputting said digit groups to said main storage means.

8. The combination set forth in claim 7, further including manually operable means for establishing a signal path for generation of a picture by said display means in response to said first portions of said television signals and alternatively establishing a signal path for generation of a picture by said display means comprising sets of characters in response to said video signals representing parts of characters.

9. The combination as set forth in claim 7. wherein said low frequency signal recorder means recited in Clause e. and said low frequency signal recorder means recited in Clause f are provided by a single signal recorder.

10. The combination as set forth in Claim 7, wherein said first and second buffer storage means are provided by a single buffer store.

* * * * *